United States Patent [19]
Maddalozzo, Jr. et al.

[11] Patent Number: 6,105,118
[45] Date of Patent: Aug. 15, 2000

[54] SYSTEM AND METHOD FOR SELECTING WHICH DATA COPY TO READ IN AN INFORMATION HANDLING SYSTEM

[75] Inventors: John Maddalozzo, Jr.; Gerald Francis McBrearty; Johnny Meng-Han Shieh, all of Austin, Tex.

[73] Assignee: International Business Machines Corporation, Armonk, N.Y.

[21] Appl. No.: 09/017,335

[22] Filed: Feb. 2, 1998

[51] Int. Cl.[7] .................................................. G06F 12/00
[52] U.S. Cl. ...................... 711/167; 163/151; 163/158; 163/122
[58] Field of Search ................................. 711/114, 122, 711/112, 167; 707/102; 714/5

[56] References Cited

U.S. PATENT DOCUMENTS

| | | | |
|---|---|---|---|
| 5,239,643 | 8/1993 | Blount et al. ............................ | 707/102 |
| 5,390,313 | 2/1995 | Yanai et al. ............................ | 711/122 |
| 5,519,844 | 5/1996 | Stallmo ................................. | 711/114 |
| 5,548,711 | 8/1996 | Brant et al. ............................ | 714/5 |
| 5,636,359 | 6/1997 | Beardsley et al. ..................... | 711/122 |
| 5,708,769 | 1/1998 | Stallmo ................................. | 714/6 |
| 5,819,310 | 10/1998 | Vishlitzky et al. .................... | 711/114 |
| 5,937,428 | 8/1999 | Jantz ...................................... | 711/114 |

OTHER PUBLICATIONS

IBM TDB "Selecting Mirrored Disk Unit for Read Operations", vol. 33, No. 4, Sep. 1990, pp. 33–34.

IBM TDB "Automatic Swap of the Primary and Secondary Mirrors in a Disk Mirror System", vol. 36, No. 12, Dec. 1993, pp. 85–86.

IBM TDB "Reduction of Delay Experienced during Mirror Disk Access Failures", vol. 36, No. 12, Dec. 1993, pp. 601–602.

*Primary Examiner*—John W. Cabeca
*Assistant Examiner*—Fred F. Tzeng
*Attorney, Agent, or Firm*—Leslie A. Leeuwen; Thomas E. Tyson

[57] ABSTRACT

The invention is a system, method, and computer readable medium for determining which copy of data to access in an information handling system. Since the same data is often stored in more than one storage location (e.g., on more than one physical volume or disk, or in more than one memory area), it is often more efficient to read a particular copy of the data. The present invention determines which copy of the desired data can be read most efficiently (i.e. in the least amount of time), and then accesses that particular copy of the data. In an embodiment of the invention, when a read request is received, each mirrored disk (i.e. copy) containing the requested data is checked to determine which disk contains the fewest relocated blocks within the desired read area. The data is then read from the mirrored disk with the fewest relocated blocks within the read area. The present invention decreases the amount of time it takes to perform I/O operations in an information handling system, as the data copy which is read is the one which can be read in the least amount of time.

13 Claims, 5 Drawing Sheets

SYSTEM AND METHOD FOR SELECTING WHICH DATA COPY TO READ IN AN INFORMATION HANDLING SYSTEM

FIELD OF THE INVENTION

The present invention relates to information handling systems, and, more particularly, to a system and method for selecting which data copy to read in an information handling system.

BACKGROUND OF THE INVENTION

In today's data processing environment, it is often desirable to maintain more than one copy of data. Maintaining multiple copies of data increases the availability of the data, and decreases the possibility that data will be lost due to memory failure, disk failure, or other hardware problem.

One method used to maintain multiple copies of data is known as mirroring. Mirroring is a form of RAID (Redundant Array of Independent Disks), and is often referred to as RAID-1. Mirroring is implemented by storing two or more copies of data on two or more different disks. Data may be read from any of the disks on which it is stored, so long as the disk is available.

In a typical information handling system, each fixed-disk drive is referred to as a physical volume, and has a unique name. Each physical volume in use belongs to a volume group. The physical volumes within a volume group are divided into physical partitions of the same size. Within each volume group, one or more logical volumes may be defined. Data on a logical volume appears to be contiguous to a user, but is usually discontiguous on the physical volume. Each logical volume is divided into one or more logical partitions, where each logical partition corresponds to one or more physical partitions. To implement mirroring, additional physical partitions are used to store the additional copies of each logical partition.

At times, a portion of a disk (i.e. one or more blocks) may become unavailable for use. Data stored at the unavailable locations on the disk can not be read. It is not desirable to discard an entire disk because a small portion of the disk is unavailable. Thus, many I/O systems utilize relocation in order to continue using a disk with some unavailable blocks. If an I/O request (i.e. a read or write request) is directed to an unavailable location, it is mapped to a different location. The mapping increases the amount of time it takes to perform I/O, and if a significant amount of mapping needs to be performed, system performance may degrade.

Consequently, it would be desirable to have a system and method for decreasing the amount of time it takes to perform I/O operations in an information handling system. It would also be desirable to minimize the performance impact caused by unavailable blocks on a physical volume.

SUMMARY OF THE INVENTION

Accordingly, the present invention is directed to a system, method, and computer readable medium for determining which copy of data to access in an information handling system. Since the same data is often stored in more than one storage location (e.g., on more than one physical volume or disk, or in more than one memory area), it is often more efficient to read a particular copy of the data. The present invention determines which copy of the desired data can be read most efficiently (i.e. in the least amount of time), and the data is then accessed from the most efficient copy.

In an embodiment of the present invention, when a read request is received, each mirrored disk (i.e. copy) containing the requested data is checked to determine which disk contains the fewest relocated blocks within the desired read area. A first mirrored disk in the logical volume is obtained, and a check is made to determine if the mirror is active. If it is active, the starting logical address is mapped to the corresponding block on the mirrored disk. Next, the ending logical address is mapped to the corresponding block on the mirrored disk. The number of relocated blocks between the starting block and the ending block is then determined. A check is then made to determine if there are more mirrors in the logical volume. If there are more mirrors, the next mirrored disk is obtained. These steps are repeated for each mirrored disk in the logical volume. When there are no more mirrors, it is then determined which active mirror contains the fewest relocated blocks within the read area corresponding to the desired data. The data is then read from the mirrored disk with the fewest relocated blocks within the read area.

An advantage of the present invention is that it decreases the amount of time it takes to perform I/O operations in an information handling system, as the data copy which is read is the one which can be read in the least amount of time. Another advantage of the present invention is that the fewest possible number of read operations are needed to obtain the desired data. A further advantage of the present invention is that it minimizes the performance impact caused by unavailable blocks on a physical volume.

BRIEF DESCRIPTION OF THE DRAWINGS

The foregoing and other features and advantages of the present invention will become more apparent from the detailed description of the best mode for carrying out the invention as rendered below. In the description to follow, reference will be made to the accompanying drawings, where like reference numerals are used to identify like parts in the various views and in which.

DETAILED DESCRIPTION OF A PREFERRED EMBODIMENT OF THE INVENTION

Figure 1:
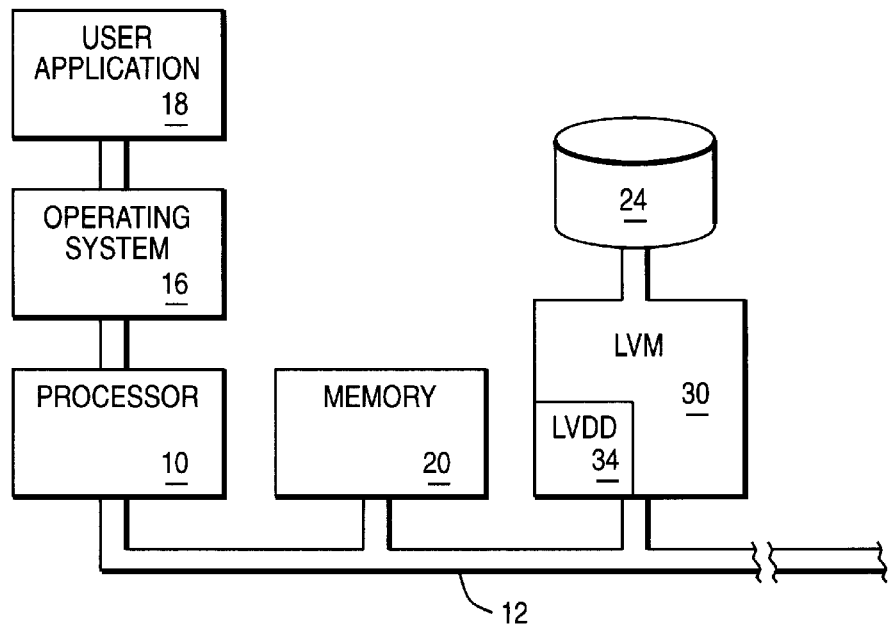
FIG. 1 is a block diagram of an information handling system on which the present invention may be implemented.

The invention may be implemented on a variety of hardware platforms, including personal computers, workstations, mini-computers, and mainframe computers. Many of the steps of the method according to the present invention may be advantageously implemented on parallel processors of various types. Referring now to FIG. 1, a typical configuration of an information handling system that may be used to practice the novel method of the present invention will be described. The computer system of FIG. 1 has at least one processor 10. Operating system 16 runs on processor 10, providing control and coordinating functions of the various components of the information handling system. One or more user applications 18 may execute in the information handling system. Processor 10 is interconnected via system bus 12 to memory 20, and logical volume manager (LVM) 30. LVM 30 includes logical volume device driver (LVDD) 34, and is connected to disk storage subsystem 24.

As discussed above, in the background of the invention section herein, each individual fixed-disk drive which is part of disk storage subsystem 24 is referred to as a physical volume, and has a unique name. Each physical volume is divided into physical partitions of the same size. A volume group consists of one or more physical volumes, and each physical volume in use belongs to a volume group. Within each volume group, one or more logical volumes are defined. Each logical volume is divided into one or more logical partitions, where each logical partition corresponds to at least one physical partition.

In the described embodiment, LVM 30 controls and manages disk resources by mapping data between the logical view of storage as used by application programs, and the actual physical disks. LVM 30 accomplishes this mapping through the use of LVDD 34, which preferably manages and processes I/O requests. LVDD 34 translates logical addresses from user applications 18 and operating system 16 into physical addresses, and sends I/O requests to specific device drivers.

Figure 2:
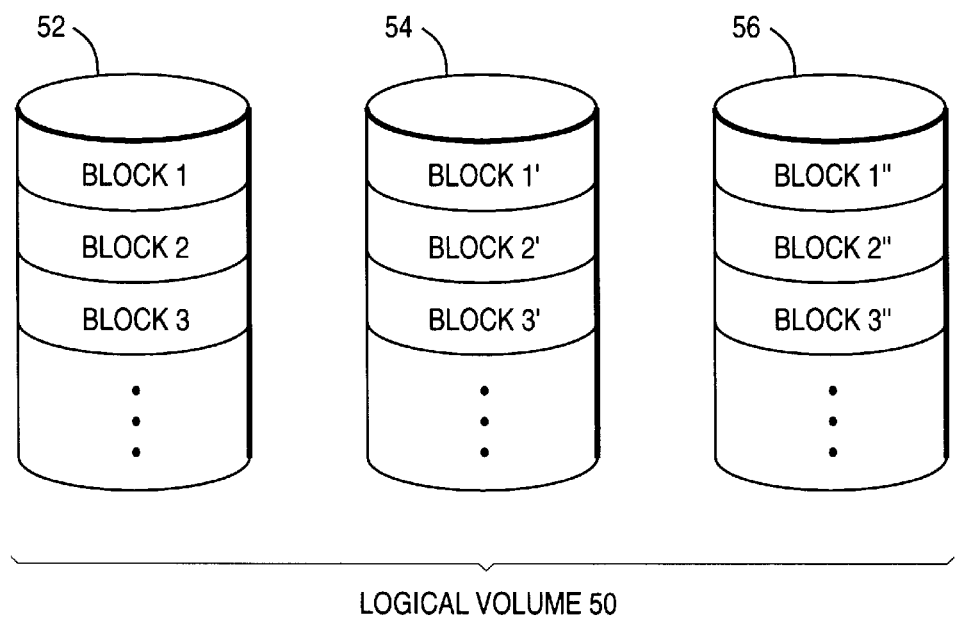
FIG. 2 is a block diagram of a logical volume containing three mirrored disks, on which the present invention may be implemented.

Referring now to FIG. 2, a logical volume containing three mirrored disks will now be described. Logical volume 50 includes physical volumes 52, 54, and 56. Physical volumes 52, 54, and 56 are part of disk storage subsystem 24 (shown in FIG. 1). Physical volumes 52, 54, and 56 are also referred to as mirrors, or mirrored disks. The data stored in logical volume 50 is stored on three different disks, i.e. physical volumes 52, 54, and 56, and is therefore referred to as triply-mirrored. Each block of data is stored on each physical volume, and thus each physical volume contains a complete copy of the data. Although FIG. 2 depicts a triply-mirrored logical volume, the present invention may be implemented with any logical volume which contains at least two mirrors.

Figure 3:
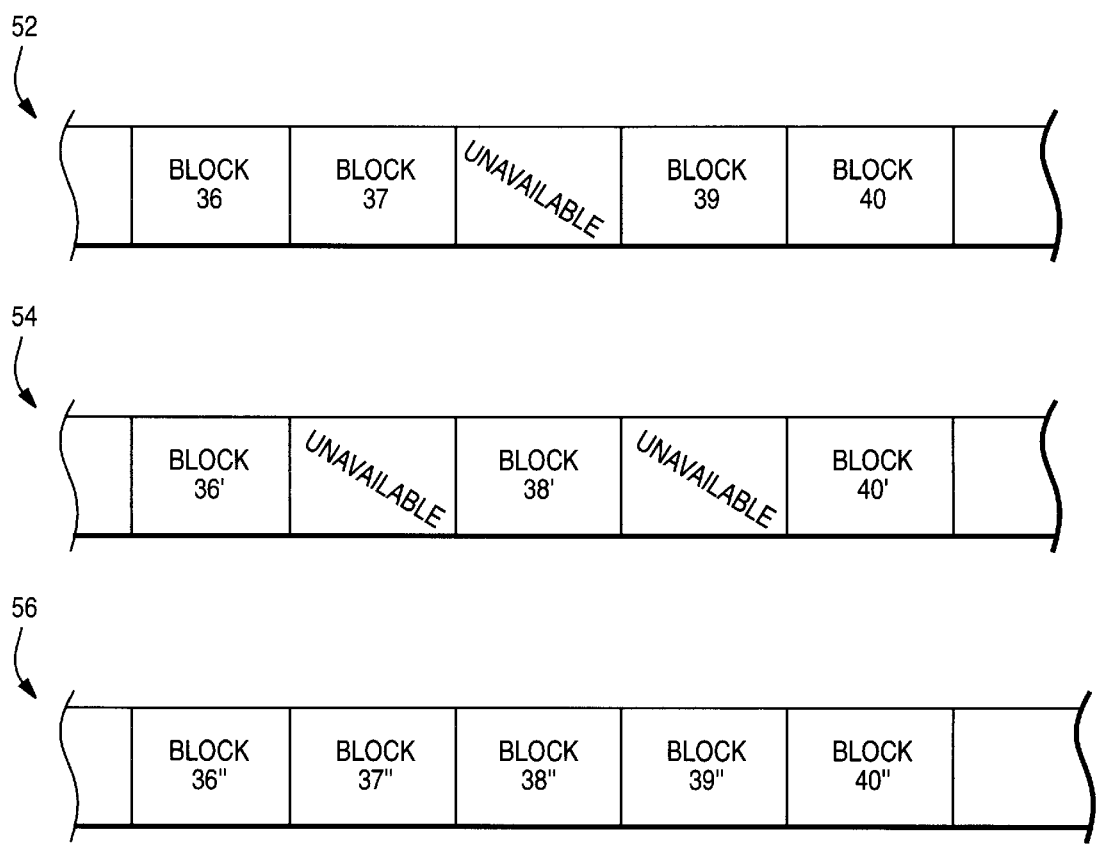
FIG. 3 is diagram showing blocks, including unavailable blocks, on the three disks depicted in FIG. 2.

The present invention is a system, method, and computer-readable medium for determining which copy of data to read in an information handling system. Since the same data is often stored in more than one place (e.g., on more than one physical volume or disk, or in more than one memory area), it is often more efficient to access a particular copy of the data. The present invention determines which copy of the desired data can be read most efficiently (i.e. in the least amount of time). Although the invention will be described with reference to determining which mirrored copy of data to read in a disk storage system, this is not meant to be limiting. Those skilled in the art will appreciate that the present invention may be implemented in any information handling system which maintains two or more copies of data. Referring now to FIG. 3, an example situation will be described, wherein it is more efficient to read data from a particular physical volume.

Referring now to FIG. 3, a section of each physical volume 52, 54, and 56 is shown, where each section includes several memory (i.e. storage) areas, referred to as blocks. For each physical volume, blocks 36 through 40 are illustrated. On physical volume 52, block 38 is unavailable. Similarly, on physical volume 54, blocks 37' and 39' are unavailable. Blocks may become unavailable for a variety of reasons, such as when a portion of the media surface has become unusable. Unavailable blocks are relocated on another section of the disk. Each disk contains a list of unavailable blocks, and their new locations. For example, physical volume 52 would contain a list which includes an entry for block 38. A relocated block address would be associated with block 38, and the data which would normally be stored at block 38 would be stored at the relocated block address. Thus, in order to read blocks 36–40 from physical volume 52, it actually requires three read operations. Blocks 36–37 are read with the first read operation. Relocated block 38 is read from its relocated block address with the second read operation. Finally, blocks 39–40 are read with the third read operation.

It can be seen that the more relocated blocks in a desired data area, the more inefficient it becomes to read the desired data. For example, it requires five separate read operations to read blocks 36'–40' from physical volume 54. The first read operation reads block 36', the second read operation reads relocated block 37', the third read operation reads block 38', the fourth read operation reads relocated block 39', and the fifth read operation reads block 40'.

If desired data resides in blocks 36–40 on each disk, then it is most efficient to read the data from physical volume 56, as it has the fewest number of unavailable, or relocated, blocks. In the example shown in FIG. 3, physical volume 56 has no relocated blocks, and thus only one read operation is necessary to read blocks 36"–40". Although FIG. 3 depicts blocks 36–40 for all three physical volumes, it may be that the desired data resides in different locations on each of the three volumes. For example, a logical read of five blocks may translate into a physical read of blocks 1–5 on a first physical volume, blocks 30–34 on a second physical volume, and blocks 101–105 on a third physical volume. Those skilled in the art will appreciate that the method of the present invention may be utilized with any number of physical volumes, and regardless of where desired data is located on each physical volume.

The present invention determines which physical volume contains the fewest number of relocated, or unavailable, blocks for a particular read of desired data. The read is then performed using the physical volume, or mirrored disk, with the fewest number of relocated blocks. This ensures that the read is performed in the most efficient manner possible (i.e. with the fewest number of read operations).

Figure 4:
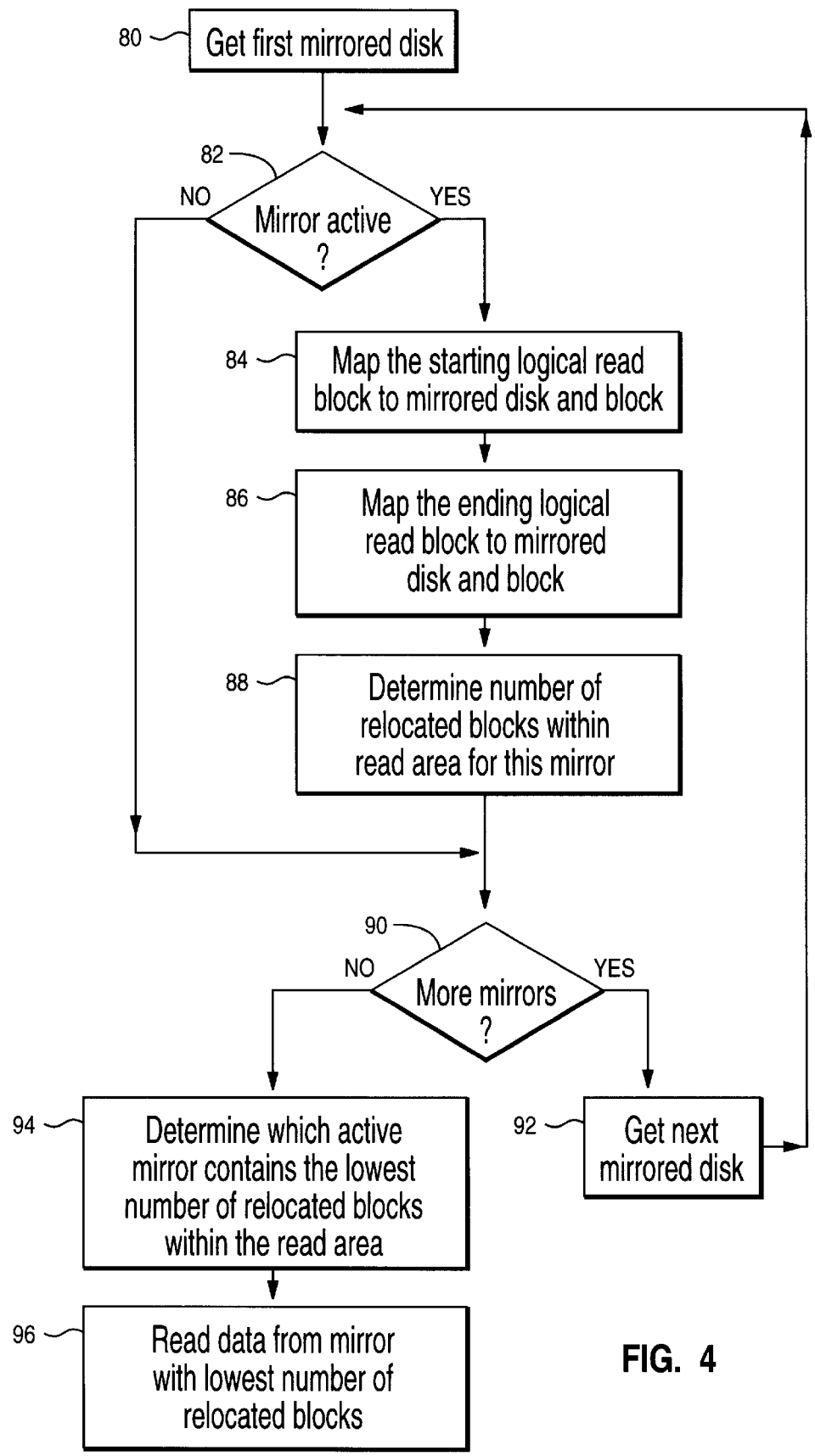
FIG. 4 is a flow chart illustrating a method for determining from which mirrored disk data is most efficiently read.

FIG. 4 is a flow chart which illustrates a method for implementing the present invention. The first mirrored disk in the logical volume is obtained (step 80), and a check is made to determine if the mirror is active (step 82). If it is active, the starting logical address is mapped to the corresponding block on the mirrored disk (step 84). Next, the ending logical address is mapped to the corresponding block on the mirrored disk (step 86). The number of relocated blocks between the starting block and the ending block is then determined (step 88). Further details regarding step 88 are given below, with reference to FIG. 5.

A check is then made to determine if there are more mirrors in the logical volume (step 90). If there are more mirrors, the next mirrored disk is obtained (step 92) Steps 82 through 90 are repeated for each mirror in the logical volume. When there are no more mirrors (i.e. the answer to the question in step 90 is "no"), it is then determined which active mirror contains the fewest relocated blocks within the read area corresponding to the desired data (step 94). The data is then read from the mirrored disk with the fewest relocated blocks within the read area (step 96). This results in the fewest number of read operations in order to obtain the desired data. Further details regarding the reading of the data are described below, with reference to FIG. 6.

Figure 5:
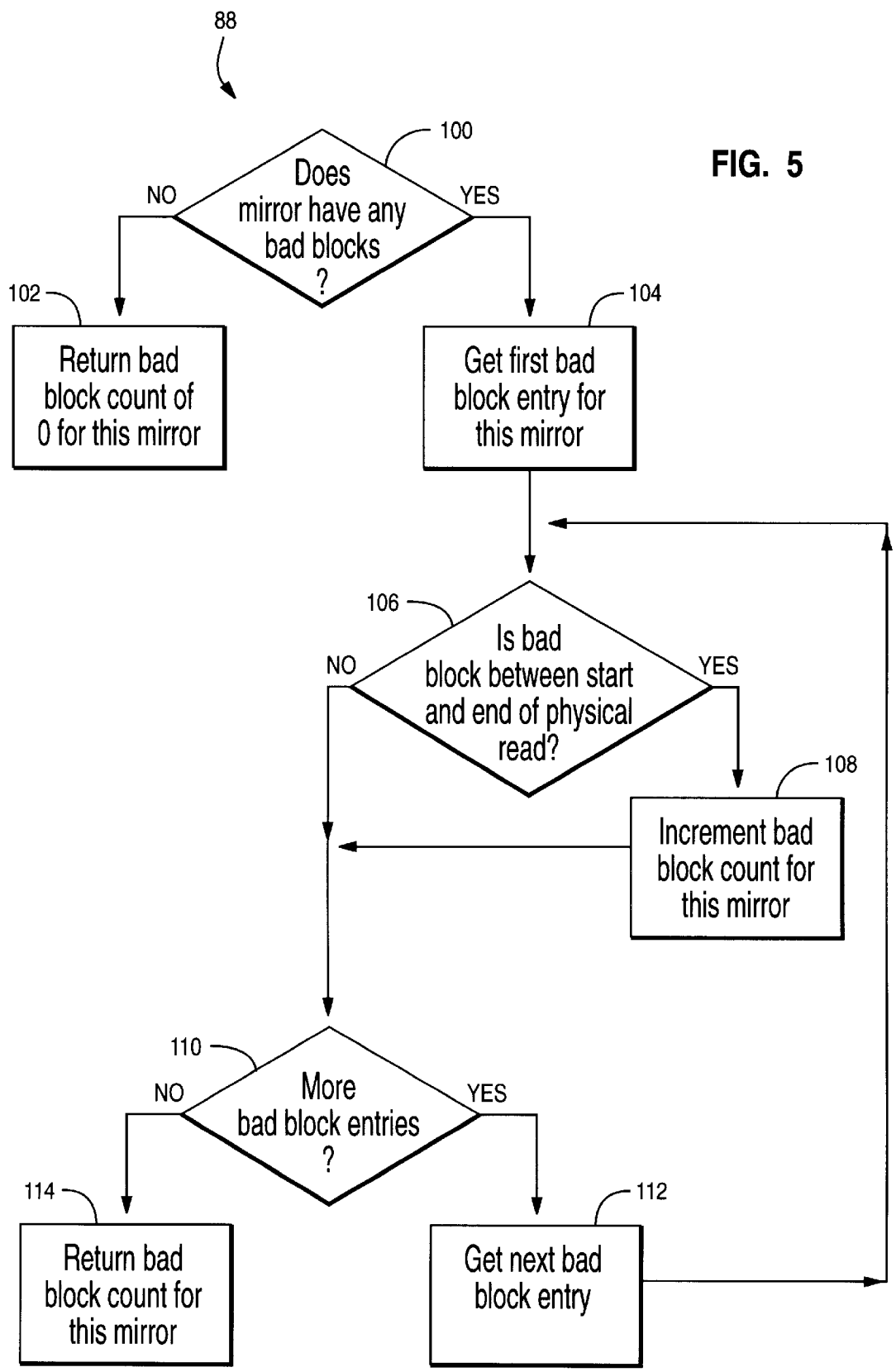
FIG. 5 is a flow chart illustrating a method for determining which mirrored disk contains the fewest number of relocated blocks.

Referring now to FIG. 5, further details regarding step 88 will now be described. As discussed above, with reference to FIG. 3, each mirror (i.e. physical volume) contains a list of bad, or relocated, blocks, along with a new address for each relocated block. The first step, then, is to determine if the mirror has any bad blocks (step 100). This step is preferably accomplished by checking to see if there are any entries in the bad block list. If there are no entries, then a bad block count of zero is returned for the mirror (step 102).

If there are entries in the bad block list, the first bad block entry is obtained (step 104). A check is made to determine if the bad block is between the start and end of the physical read for the desired data (step 106). If so, a bad block count is incremented for this mirror (step 108). It is then determined if there are more bad block entries for the disk (step 110). If so, the next bad block entry is obtained (step 112), and step 106 and 108 (if necessary) are repeated for each bad block entry. When there are no more bad block entries (i.e. the answer to the question in step 110 is "no"), the bad block count for this mirror is returned (step 114).

Figure 6:
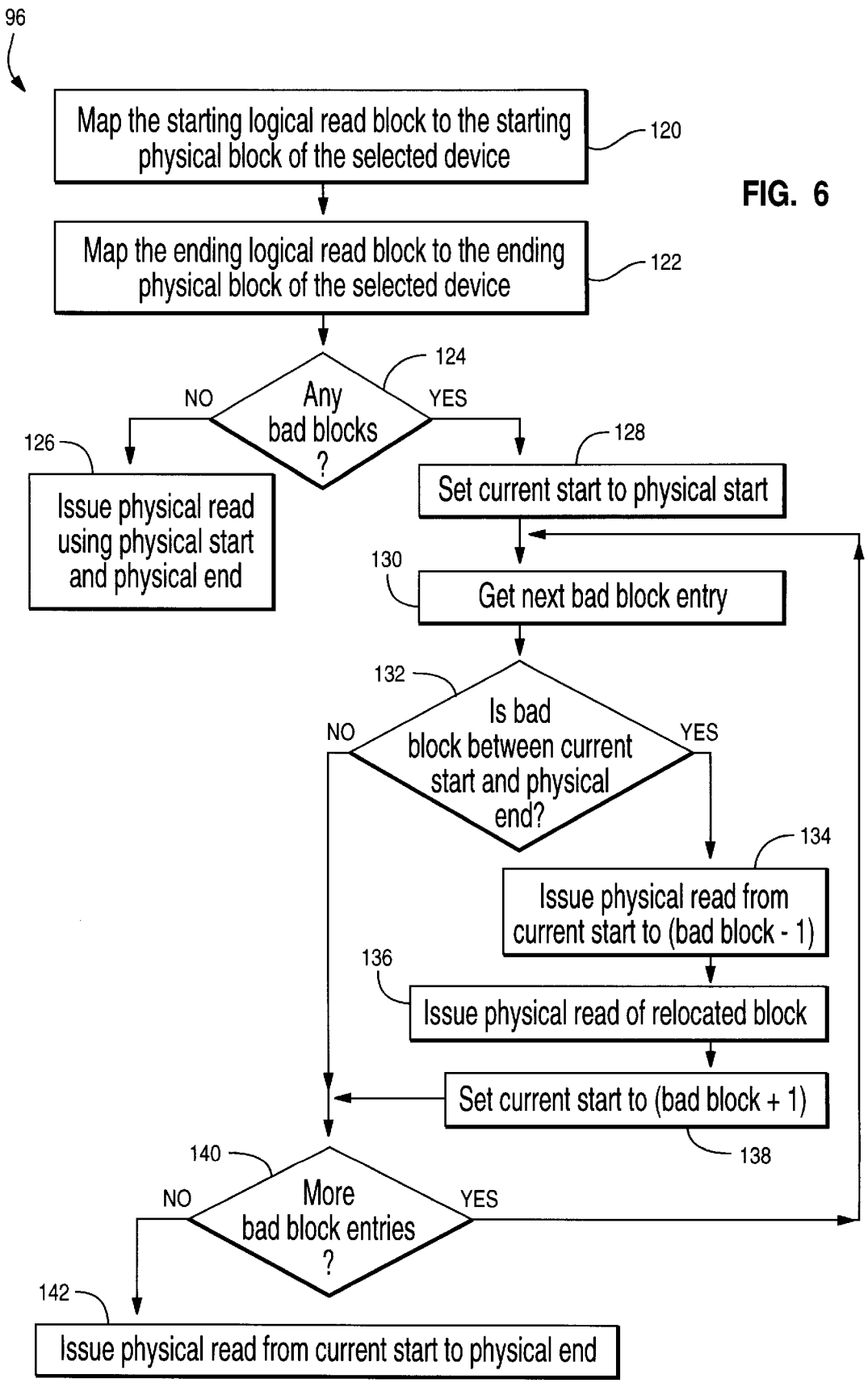
FIG. 6 is a flow chart illustrating a method for reading data from a selected disk.

Referring now to FIG. 6, a flowchart illustrating a method for reading data from the selected mirror (step 96 in FIG. 4) will now be described. The logical starting address is mapped to a starting physical block of the selected mirrored device (step 120). The logical ending address is then mapped to an ending physical block of the selected mirrored device (step 122). A check is made to determine if the physical volume contains any bad blocks (step 124). This is preferably determined by checking the bad block list for the mirrored disk. If there are no bad blocks on the disk, a physical read request is issued, using the physical start block and physical end block as determined in steps 120 and 122 (step 126).

If there are bad blocks on the disk, a current start variable is set to be equal to the physical start block (step 128). A bad block entry is obtained (step 130). A check is made to determine if the bad block is between the current start block and the physical end block (step 132). If so, a physical read request is issued from the current start to the block prior to the bad block, referred to as (bad block −1) (step 134). Next, a physical read is issued for the bad block at its relocated block address (step 136). The current start is then set equal to the block following the bad block, referred to as (bad block +1) (step 138). A check is then made to determine if there are more bad block entries for the disk (step 140). If so, steps 130 through 140 are repeated, as necessary, for each bad block. When there are no more bad block entries (i.e. the answer to the question in step 140 is "no"), a physical read request is issued from the current start to the ending physical block (step 142).

The present invention increases read efficiency by determining which mirrored copy of data contains the fewest unavailable memory areas (i.e. bad or relocated blocks in the described embodiment), and then reading the data from the copy with the fewest unavailable areas. The present invention decreases the time necessary to perform I/O operations in an information handling system, and minimizes the impact of unavailable or relocated memory areas on a physical volume.

Although the invention has been described with a certain degree of particularity, it should be recognized that elements thereof may be altered by persons skilled in the art without departing from the spirit and scope of the invention. One of the preferred implementations of the invention is as sets of instructions resident in the memory 20 of one or more computer systems configured generally as described in FIG. 1. Until required by the computer system, the set of instructions may be stored in another computer readable memory, for example in a hard disk drive, or in a removable memory such as an optical disk for eventual use in a CD-ROM drive or a floppy disk for eventual use in a floppy disk drive. Further, the set of instructions can be stored in the memory of another computer and transmitted over a local area network or a wide area network, such as the Internet, when desired by the user. One skilled in the art would appreciate that the physical storage of the sets of instructions physically changes the medium upon which it is stored electrically, magnetically, or chemically so that the medium carries computer readable information. The invention is limited only by the following claims and their equivalents.

What is claimed is:

1. A method for accessing data from a memory containing two or more copies of the data, comprising the steps of:
    calculating a number of relocated memory areas between a start address and an end address for each copy of the data, wherein said calculating includes the steps of:
        reading one or more bad block entries, wherein each bad block entry contains a bad block address; and
        for each bad block address, determining if the bad block address is located between the start address and the end address; and
    reading a selected copy of the data, wherein the selected copy has a lowest number of relocated memory areas.

2. A method according to claim 1, wherein said calculating step further comprises the step of counting a number of relocated memory areas between the start address and the end address.

3. A method according to claim 2, wherein said counting step comprises the step of:
    if the bad block address is located between the start address and the end address, incrementing a counter.

4. An information handling system, comprising:
    a memory means;
    two or more copies of data stored in said memory means;
    means for calculating a number of relocated memory areas between a start address and an end address for each copy of the data, wherein said means for calculating includes:
        means for reading one or more bad block entries, wherein each bad block entry contains a bad block address; and
        means for determining if the bad block address is located between the start address and the end address; and
    means for reading a selected copy of the data, wherein the selected copy has a lowest number of relocated memory areas.

5. An information handling system according to claim 4, wherein said means for calculating further comprises means for counting a number of relocated memory areas between the start address and the end address.

6. An information handling system according to claim 5, wherein said means for counting comprises:
    means for incrementing a counter.

7. An information handling system, comprising:
    a logical volume, including a plurality of physical volumes;
    at least two copies of data stored in said logical volume, wherein each copy is stored on a different physical volume;
    means for determining a storage location for each copy of the data;

means for calculating a number of relocated memory areas between a start address and an end address in each storage location, wherein said means for calculating includes:

means for reading one or more bad block entries, wherein each bad block entry contains a bad block address; and means for determining if the bad block address is located between the start address and the end address; and means for reading the data from a selected storage location, wherein the selected storage location contains a lowest calculated number of relocated memory areas.

8. An information handling system according to claim 7, wherein said means for determining a storage location for each copy of the data comprises:

means for mapping a data starting address to the start address within a selected physical volume; and means for mapping a data ending address to the end address within the selected physical volume.

9. An information handling system according to claim 8, wherein said means for calculating comprises means for counting a number of relocated memory areas between the start address and the end address.

10. An information handling system according to claim 9, wherein said means for counting comprises:

means for incrementing a counter.

11. A computer readable medium for accessing data from a memory containing two or more copies of the data, comprising:

means for calculating a number of relocated memory areas between a start address and an end address for each copy of the data, wherein said means for calculating includes:

means for reading one or more bad block entries, wherein each bad block entry contains a bad block address; and means for determining if the bad block address is located between the start address and the end address; and means for reading a selected copy of the data, wherein the selected copy has a lowest number of relocated memory areas.

12. A computer readable medium according to claim 11, wherein said means for calculating further comprises means for counting a number of relocated memory areas between the start address and the end address.

13. A computer readable medium according to claim 12, wherein said means for counting comprises:

means for incrementing a counter.

* * * * *